United States Patent [19]

Desvignes et al.

[11] 4,360,650

[45] Nov. 23, 1982

[54] PROCESS FOR THE PRODUCTION OF COPOLYMERS OF PROPYLENE AND BUT-1-ENE, PRODUCTS RESULTING THEREFROM AND USES THEREOF

[75] Inventors: Bernard Desvignes; Jean C. Bailly; Pierre Mangin, all of Martigues, France

[73] Assignee: Naphtachimie Societe Anonyme, Courbevoir, France

[21] Appl. No.: 173,116

[22] Filed: Jul. 28, 1980

[30] Foreign Application Priority Data

Jul. 30, 1979 [FR] France ............................... 79 19520

[51] Int. Cl.³ .............................................. C08F 2/34
[52] U.S. Cl. ...................................... 526/60; 428/215; 428/516; 526/68; 526/142; 526/348.1; 526/348.6
[58] Field of Search ................. 526/60, 68, 142, 348.6

[56] References Cited

FOREIGN PATENT DOCUMENTS

| 1018341 | 1/1966 | United Kingdom . |
| 1452424 | 10/1976 | United Kingdom . |
| 1495776 | 12/1977 | United Kingdom . |
| 1497577 | 1/1978 | United Kingdom . |

*Primary Examiner*—Stanford M. Levin
*Attorney, Agent, or Firm*—McDougall, Hersh & Scott

[57] ABSTRACT

The invention concerns a process for the production of copolymers of propylene and but-1-ene which can be used for the production of hollow bodies or heat-sealable films and wherein the proportion by weight of units derived from but-1-ene is from 10 to 40% and wherein the proportion of isolated ethyl branches is at least equal to the square of the proportion of units derived from propylene contained in said polymers. The process is characterized in that a gaseous mixture of propylene and but-1-ene is brought into contact, in the absence of liquid diluent, with a catalytic system which is stereospecific in the polymerization of propylene alone.

9 Claims, 2 Drawing Figures

PROCESS FOR THE PRODUCTION OF COPOLYMERS OF PROPYLENE AND BUT-1-ENE, PRODUCTS RESULTING THEREFROM AND USES THEREOF

The invention concerns a process for the production of copolymers of propylene and but-1-ene. The copolymers which are produced by this process are suitable for various uses in the field of thermoplastic materials; they can also be used in the production of heat-sealable films.

BACKGROUND OF THE INVENTION

It has previously been proposed, in the U.S. application of Desvignes et al. Ser. No. 108,845, filed Dec. 31, 1979, abandoned, entitled "Copolymers of Propylene and But-1-ene and Uses Thereof", the preparation of copolymers of propylene and but-1-ene wherein the proportion by weight of units derived from but-1-ene, said proportion being denoted by the symbol (Bu), is from 10 to 40% and the structure of which is such that the proportion, denoted by the symbol "PRE", of ethyl branches which are isolated, with respect to the whole of the ethyl branches of the copolymer, is at least equal to the square of the proportion of the links derived from propylene [P] which are contained in the copolymers.

In the Examples illustrating the above-specified applications, the copolymers are prepared by the copolymerization of propylene and but-1-ene, within a liquid diluent and in the presence of a catalytic system comprising a solid compound based on titanium trichloride and one or more organo-metallic compounds of metals of groups II and III of the periodic table of elements.

In order to produce copolymers of a structure such that the proportion of ethyl branches which are isolated, with respect to the whole of the ethyl branches of the copolymers in question is at least equal to the square of the proportion of the links derived from propylene, it is necessary for the ratio between the amounts of propylene and but-1-ene contained in the polymerization medium to be maintained at a substantially constant value, throughout the polymerization operation. The above-mentioned ratio is selected on the one hand according to the but-1-ene content of the copolymer to be produced and, on the other hand, according to the catalytic systems used. The ratio can be determined experimentally. Preferably, the ratio between the amounts of propylene and but-1-ene is maintained substantially constant during the polymerization step by means of an apparatus comprising on the one hand an analyzer for measuring the ratio between the concentrations in respect of propylene and but-1-ene in the polymerization reaction vessel and, on the other hand, means for introducing propylene and but-1-ene into the reaction vessel, said means being controlled in dependence on each other and by the analyzer.

The resulting copolymers are suitable for various uses and they are particularly suitable for the production of heat-sealable films comprising a film of thermoplastic material such as isotactic polypropylene, which is coated on one face with at least one layer of said copolymer. The polyproylene film which is usually from 5 microns to 1 mm in thickness, and in most cases from 10 to 100 microns in thickness, can be produced by any known means, for example extrusion. Such heat-sealable films must be capable of being heat-sealed at fairly low temperatures, of the order of 115° C. or if possible lower. It is also necessary for the heat seal to afford substantial mechanical strength as soon as it is formed, without the necessity to allow the heat-sealed film to cool completely; this latter quality, which is referred to as the hot strength of the heat seal or weld, is expressed by two temperatures which define a region within which the strength of the heat-sealed join is sufficient.

Copolymers containing more than 20% by weight of units derived from but-1-ene are particularly suitable for making heat-sealable films, because they provide the films both with fairly low heat-sealing temperatures, around 115° C., and wide ranges in respect of hot strength of the heat-sealed join.

BRIEF DESCRIPTION OF THE INVENTION

It has now been found that it is possible to produce copolymers of propylene and but-1-ene, which comply with the above-mentioned criteria, by using an improved process for the direct polymerization of the monomers in the gaseous state. This process has the advantage of providing the copolymers directly, without having to be separated from a liquid polymerization diluent. In addition, it has surprisingly been found that the copolymers which are prepared by this process, and more particularly copolymers containing more than 20% by weight of units derived from but-1-ene, have a structure which is different from the structure that could have been forecast by theoretical considerations, and also properties which are even better; in particular, it is possible for such copolymers to be used for the production of heat-sealable films whose sealing temperature is lowered to about 100° C.

The invention concerns the production of copolymers of propylene and but-1-ene, wherein the proportion by weight of units derived from but-1-ene, as denoted by the symbol (Bu), is from 10 to 40% and preferably from 20 to 35%, and wherein the proportion, denoted by the symbol "PRE", of isolated ethyl branches, is at least equal to the square of the proportion [P] of units derived from propylene, contained in said copolymers, in accordance with a process characterized in that a gaseous mixture of propylene and but-1-ene is brought into contact, in the absence of liquid diluent, with a catalytic system which is stereospecific in the polymerization of propylene alone, comprising a solid compound based on titanium trichloride and one or more organo-metallic compounds of the metals of groups II and III of the periodic table of elements.

DETAILED DESCRIPTION OF THE INVENTION

The solid titanium trichloride-based compounds which can be used in the production of the copolymers according to the invention are selected from solid compounds of titanium, which belong to the stereospecific catalytic systems used in the production of isotactic polypropylene. Such compounds are generally produced by the reduction of titanium tetrachloride by means of hydrogen, aluminum, an aluminum hydride or an organo-aluminum compound such as an alkylaluminum chloride. Generally, preparation of such titanium compounds includes or is followed by a treatment of such compounds at a temperature of less than 160° C. in order to produce the titanium trichloride in the gamma crystallographic form. Advantageously, the titanium compounds are prepared by the reduction of titanium tetrachloride by means of an organo-aluminum compound at a temperature of from −10° to 80° C., and then heating the resulting precipitate in the presence of an excess of titanium tetrachloride, at a temperature which may be up to 115° C., said operation being carried out in the presence of an electron donor compound or being associated with a treatment by means of an electron donor compound such as an ether of formula R'—O—R" wherein R' and R" are alkyl groups containing from 2 to 5 carbon atoms. Preferably, the solid titanium trichloride-based compound is prepared in accordance with the information given in U.S. Pat. No. 4,110,248, issued Aug. 29, 1978 and by U.S. Pat. No. 4,199,474, issued Apr. 27, 1980, by the reduction of titanium tetrachloride by means of an organo-aluminum compound and then heating of the resulting precipitate at a temperature which is capable of reaching 115° C., the number of moles of titanium tetrachloride used being in excess of at least 20% with respect to the molar amount of organic radicals of the organo-aluminum compound and the preparation operation being carried out in the presence, as an electron donor compound, of from 2 to 5 moles of an aliphatic ether as defined above, per mole of organo-aluminum compound. In accordance with this latter method of preparing the solid titanium trichloride-based compound, the organo-aluminum compound is mixed, before the reduction of the titanium tetrachloride, with at least 0.3 mole of ether per mole of organo-aluminum compound.

The organo-metallic compound or compounds of a metal of groups II and III of the periodic table, which are used as a co-catalyst, preferably comprise organo-aluminum compounds having the mean formula $AlR_xZ_{(3-x)}$, wherein R represents an alkyl group containing 2 to 12 carbon atoms, Z represents a hydrogen atom or a halogen such as chlorine or bromine and x is an integer or a fraction which can be of any value from 1 to 3. Preferably, these compounds are selected from dialkylaluminum chlorides having the formula $ClAlR_2$, wherein R corresponds to the above-indicated definition, more particularly diethylaluminum chloride. These compounds are advantageously used in amounts such that the ratio between the number of atoms of the metal of groups II and III of the organo-metallic compounds, and the number of titanium atoms of the titanium compound, is from 1 to 50.

The components of the catalytic system can be used in different ways.

The solid titanium trichloride-based compound can be introduced into the polymerization reaction vessel directly associated with a carrier comprising solid granules or in the form of a pre-polymer which is produced by means of preliminary polymerization of ethylene, propylene, but-1-ene or a mixture of two or more of said olefins, in the presence of a catalytic system as defined above. For the production of the pre-polymer, it is sufficient to polymerize from 20 to 5000 moles of olefins per gram-atom of titanium of the catalytic system; accordingly, the amounts of pre-polymer used remain low with respect to the amounts of copolymer which is finally produced and consequently have little influence on the properties thereof. The pre-polymer in which the titanium compound remains included can be directly used in accordance with the invention, as the solid titanium compound. Preferably, the pre-polymer is prepared in the absence of an inert liquid diluent such as a saturated aliphatic hydrocarbon. However, it may be prepared in the presence of such diluent from which it is separated before being put to use. Moreover, it may be advantageous for the pre-polymer to be subjected, before being used in the process of the invention, to one or more extraction steps by means of a solvent such as an aliphatic hydrocarbon in order to produce porosity within the granules of the pre-polymer and to enhance the accessibility for the olefins to the catalytic locations.

The organo-metallic compound(s) of a metal of groups II and II of the periodic table may also be introduced directly into the polymerization reaction vessel. Such compounds may also be used in the form of a porous carrier which has previously been impregnated with such compounds; in this case, the porous carrier may be formed by solid granules, of organic or inorganic nature, or it may comprise the pre-polymer mentioned in the preceding paragraph.

The polymerization operation is carried out in the absence of liquid diluent such as liquid propylene, liquid but-1-ene or a saturated liquid hydrocarbon, by direct contact of a gaseous mixture containing the propylene and the but-1-ene, with solid particles of the copolymer in the course of formation and with the components of the catalytic system which are associated with a solid granular carrier or a pre-polymer. This operation is advantageously performed in a reaction vessel which is referred to as a "fluidization reaction vessel", by rising circulation of the mixture of monomers in the gaseous state through a fluidized bed of solid particles of the copolymer in the course of formation.

In order to produce a polymer which has the desired fluidity index, polymerization may be effected in the presence of a chain growth limiter which generally comprises hydrogen introduced into the gaseous polymerization mixture, in a proportion of from 1 to 20% by volume with respect to the olefins present in the mixture.

The speed of rise to be imparted to the gaseous mixture in order to maintain the copolymer present in the reaction vessel in a fluidized state is related to the physical parameters of the copolymer and the gaseous mixture. Of said parameters, the main ones are the size of the particles of the copolymer in the course of formation, the specific mass thereof and the viscosity and the specific mass of the gaseous mixture; speeds of rise of the order of some decimeters per second are those most generally employed.

The temperature in the reaction vessel is maintained at a sufficient level for polymerization to be rapid, but without being too close to the temperature at which agglomerates are formed which would interfere with or stop polymerization. The temperature may be from 50° to 90° C. and is preferably from 50° to 70° C.

The composition of the gaseous mixture circulating in the polymerization reaction vessel is selected in accordance with the proportion of but-1-ene which is desired in the copolymer. The total pressure in the reaction vessels is so selected as to avoid conndensation of the olefins, and is generally lower than 40 bars.

The gaseous mixture is in contact with the catalytic system present in the reaction vessel only for a limited period of time which is generally less than some tens of seconds. Accordingly, only a fraction of the olefins which are introduced into the reaction vessel is polymerized therein and it is consequently necessary for the gaseous mixture which issues from the reaction vessel to be recycled thereto, with a make-up of olefins to be polymerized. In order to ensure that the gaseous mixture does not entrain particles of the copolymer or the solid compound of the catalytic system, to the outlet of the reaction vessel, the reaction vessel may be provided for example in its upper portion with a chamber which is referred to as a tranquillization chamber, which is larger in section than the section of the reaction vessel; in the tranquillization chamber, the speed of rise of the gaseous mixture is lower than in the reaction vessel, which permits at least a part of the particles entrained to fall back into the reaction vessel. The particles which are entrained by the gaseous mixture may also be separated in a cyclone separator and returned to the reaction vessel, preferably into the lower part thereof. As polymerization of the olefins causes heat to be given off, the heat produced must be removed in order to maintain a constant temperature in the reaction vessel; the operation of removing heat for this purpose is preferably performed by circulating the gaseous mixture to be recycled, through a heat exchanger which is disposed outside the reaction vessel.

In order to produce copolymers which have the above-mentioned characteristics, it is recommended that the ratio between the amounts of propylene and but-1-ene in the polymerization medium should be maintained at a substantially constant value, throughout the polymerization step. This condition can be realised by means of an apparatus comprising on the one hand an analyzer for measuring the concentrations in respect of propylene and but-1-ene in the polymerization reaction vessel and, on the other hand, means for introducing the olefins into the reaction vessel, said means being controlled in dependence on each other and by the analyzer.

The process of the invention can also be carried into effect in a plurality of fluidized bed reaction vessels which are arranged in series. In this case, only a part of the polymerization operation is carried out in each reaction vessel and the copolymer in the course of formation circulates from the head reaction vessel to the tail reaction vessel. In an alternative form, some reaction vessels may be arranged in parallel so that the copolymer in the course of formation, which issues from one reaction vessel, is used to supply two or more secondary reaction vessels.

The finished copolymer can be discharged from the reaction vessel in which it is produced by means of different mechanical or pneumatic devices. One discharge apparatus involves providing the lower part of the reaction vessel with an orifice which is capable of being closed and which is in communication with a chamber in which the pressure obtaining is lower than the pressure obtaining in the reaction vessel. Opening of the orifice for a given period of time enables the required amount of copolymer to be introduced into the chamber. When the orifice has been closed again, it is then sufficient to communicate the chamber with the exterior, in order to collect the copolymer.

The proportion by weight in the copolymer of units derived from but-1-ene (Bu) is measured by infra-red spectrophotometry on the basis of absorption at the wavelength $\lambda = 13.05\mu$ (microns). This measurement operation is performed on a film of copolymer which is from 0.2 to 1 mm in thickness. The value of (Bu) is given by the following relationship:

$$(Bu)\% = 13 \frac{\text{Optical density at } 13.05\mu}{\text{Thickness of the film in mm}}$$

The optical density at $13.05\mu$ is equal to $\log_{10} I_o/I_t$, $I_o$ being the intensity of the incident light, $I_t$ being the intensity of the light transmitted and $\log_{10}$ being the decimal logarithm.

The proportion of links derived from propylene [P] is deduced by calculation from the measured value of (Bu).

The proportion "PRE" of isolated ethyl branches, with respect to the total of ethyl branches of the copolymer, is linked to the distribution of the links derived from but-1-ene in the macromolecular chain of the copolymers. Indeed, the copolymers of propylene and but-1-ene comprise a chain of carbon atoms on which are fixed hydrogen atoms and methyl radicals resulting from the propylene molecules and ethyl radicals resulting from the but-1-ene molecules. When two or more but-1-ene-derived links follow each other in the macromolecular chain, the branches formed by the corresponding ethyl radicals are referred to as adjacent. In contrast, when a but-1-ene-derived link is isolated between propylene-derived links, the corresponding ethyl branch is said to be isolated. The ratio "PRE" which is conveniently measured by analysis of a sample of copolymer by nuclear magnetic resonance of carbon 13, referred to as "NMR $^{13}$C", consequently expresses the proportion, in the macromolecular chains, of links derived from but-1-ene, which are isolated between two propylene links, with respect to the total of links derived from but-1-ene. According to theories relating to the mechanism of polymerization, the expression $PRE=[P]^2$ corresponds to random dispersion of the but-1-ene derived links, in the macromolecular chain; it is in accordance with the factual situation observed experimentally by G. Natta et al (Journal of Polymer Science, Volume 51, page 429, 1961) whereby the reaction speeds of propylene and but-1-ene are substantially independent of the terminal structure of the polymeric chain being grown.

Moreover, examination of the copolymers of the invention by the above-mentioned NMR $^{13}$C method indicates that the propylene-derived links are part of sequences of isotactic polypropylene, wherein the methyl branches are consequently oriented in the same manner. However, these sequences are too short to permit the copolymer, in the solid state, to dispose itself in a properly ordered spatial arrangement. It is observed in fact that the copolymers of the invention have a level of fusion enthalpy which is equal to or lower than 18 cal/g, said enthalpy being in most cases from 5 to 15 cal/g under the measuring conditions set forth in Examples 1 to 5.

Fusion enthalpy of the copolymer corresponds to the amount of heat required to melt one gram of the copolymer. The amount of heat required is linked to the spatial arrangement of the polymer as the amount of heat required increases in proportion as the structure of the polymer is more highly ordered. Thus, the fusion enthalpy of isotactic polypropylene which has a regular spatial arrangement is at least 30 cal/g. It is therefore possible, by reference to the fusion enthalpy of isotactic polypropylene, to arrive at an appreciation of the regularity of the spatial arrangement of the copolymers of the invention and consequently the degree of crystallinity thereof. The degree of crystallinity can also be evaluated by X-ray diffraction but the results obtained with this latter method are fairly arbitrary as they vary widely according to the method selected for splitting the diffraction spectrum up into an amorphous region and a crystalline region.

The copolymers prepared in accordance with the invention can be used as thermoplastic materials; in particular they can be used for the production of hollow bodies which enjoy good transparency, by extrusion-blowing.

The copolymers can also be used for the production of heat-sealable films which are formed by a film of thermoplastic material such as isotactic polypropylene, which is covered on one face by at least one layer of said copolymer. The polypropylene film which is usually from 5 microns to 1 mm in thickness and in most cases from 10 to 100 microns in thickness, can be produced by any known means such as extrusion. In order to increase the transparency of the film and improve the mechanical properties thereof, the film is usually subjected to a double drawing operation, in the direction of its width and in the direction of its length, and to a stabilization operation at a temperature of from 100° to 150° C.

The copolymers can be applied to the film after it has already been formed, for example by means of the extrusion-coating process which comprises extruding a molten copolymer onto the film when it has already been formed. It is also possible to effect co-extrusion of the film and the layer or layers of copolymer; this operation can be effected by means of an extrusion machine in which, on the one hand, the thermoplastic material for forming the film, and, on the other hand, a copolymer, are introduced into a die in a molten state so that the layer of copolymer is disposed on the surface of the film as it is being formed. The assembly is then drawn in the above-mentioned manner.

Using the copolymers of the invention, it is possible to produce heat-sealable films in which the copolymer layer or layers are from 0.1 to 10 microns and preferably from 0.5 to 5 microns in thickness, which films can be heat-sealed to themselves in a sealing temperature range which is in the region of from 90° to 150° C., so that the heat-sealed join or weld which is thus formed enjoys a sufficient level of strength both in the hot and in the cold condition. It has also been observed that the films which are produced in this way enjoy excellent transparency and a very high degree of resistance to scratching.

The process of the invention is remarkable in several respects. Indeed, it makes it possible directly to produce copolymers of propylene and but-1-ene in the form of powders, without the necessity, as in the prior art, of separating the copolymer and the liquid diluent in which the copolymer was formed. Moreover, the fact that the copolymer is produced in the form of a powder comprising granules of uniform size, of the order of 0.5 to 1 mm in diameter, is an appreciable advantage when the copolymer is put into use. Moreover, as shown by the Examples, the copolymers which are prepared in accordance with the invention have even better properties which are particularly appreciated in the production of heat-sealable films.

EXAMPLES OF THE INVENTION

Type Example of Producing a Copolymer (a) Preparation of a solid compound of trivalent titanium 380 g of titanium tetrachloride, 120 ml of anhydrous n-heptane and 27 g of diisoamyl ether are introduced into a 1 liter stainless steel reaction vessel. The mixture is heated at a temperature of 35° C. and with agitation, and a mixture of 30 g of diethylaluminum chloride and 70 g of diisoamyl ether dissolved in 180 ml of n-heptane is introduced into the reaction vessel over a period of 4 hours at a regular rate.

The precipitate formed is kept in an agitated condition for one hour at a temperature of 35° C. and then for two hours at a temperature of 65° C. The titanium compound is then washed 5 times by mixing with 500 ml of n-heptane at a temperature of 65° C., and decantation. It is preserved in n-heptane, being protected from air and moisture.

(b) Preparation of a pre-polymer 250 g of a powder of propylene and but-1-ene copolymer resulting from a previous operation, 5.4 g (45 mmoles) of diethylaluminum chloride and an amount of the titanium compound prepared in (a) above, corresponding to 15 milligram-atoms of titanium, are introduced into a stainless steel reaction vessel provided with a mechanical agitator and a heating means.

In an agitated condition, and with the contents of the reaction vessel being maintained at a temperature of 60° C., propylene is introduced at a constant flow rate of 150 g/h over 5 hours. At the beginning of the operation, and one hour and two hours later, 200 Ncm$^3$ of hydrogen at each time are also introduced into the reaction vessel. After 5 hours of polymerization, the result is 740 g of a fluid powder of pre-polymer which is of a rose-violet colour and which is preserved in nitrogen, protected from air and moisture.

(c) Polymerization of the copolymer in a fluidized bed

Polymerization is carried out in a stainless steel fluidized bed reaction vessel which is 15 cm in diameter and which is provided with an adjoining container under pressure, in which the pre-polymer is stored, and another container into which the polymer formed is discharged. Using this reaction vessel, which contains 100 g of the pre-polymer prepared in (b) above, a gaseous flow at a temperature of 60° C. and at a pressure of 7 bars is introduced, at the bottom of the reaction vessel, the gaseous flow comprising propylene, but-1-ene and a small amount of hydrogen, circulating at an upward speed of 15 cm/s. When using the copolymer of Example 4, this mixture contains 70% by volume of propylene, 28% by volume of but-1-ene and 2% by volume of hydrogen.

The fluidization gas issuing from the reaction vessel is partially cooled in an exchanger and then recycled to the reaction vessel by means of a blower; the composition and pressure of the gases are kept constant by the addition of the monomers in amounts equal to the amounts consumed during the polymerization step.

The temperature of the fluidized bed is maintained at a constant value by controlling that of the incoming gas.

The reaction vessel is supplied by the introduction of 10 g of pre-polymer, every 30 minutes. After 2 hours of polymerization, about 50 g of the copolymer is removed from the reaction vessel every 10 minutes, which substantially corresponds to the production; in this way, the bed is maintained at a substantially constant height.

Type Example of the Production of a Heat-Sealable Film

A heat-sealable film is produced by means of a co-extrusion machine which is supplied on the one hand with isotactic polypropylene and on the other hand with a copolymer in accordance with the invention. The resulting film comprises a polypropylene film which is about 1.2 mm in thickness and which is covered on each of its faces with a layer of copolymer, which is about 50 microns in thickness. The coated film is drawn about 5 times in the direction of its width, at a temperature of 110° C., and then about 10 times in the direction of its length, at a temperature of 140° C. The resulting film is about 25 microns in thickness, with the layers of polymer each being about 1 micron in thickness.

The sealing threshold of the film is measured on a sample of film which is 38 mm in width. For this purpose, heat-sealing tests are carried out on the film, by pressing together two samples of film which are disposed transversely between two flat rectangular jaws measuring 20 mm × 50 mm to which a pressure of 1 kg/cm² is applied. The jaws are heated at different temperatures of from 90° to 150° C. The cold strength of the heat-sealed join or weld is measured after the heat-sealed film has cooled to 25° C. and is expressed by the force in grams required to open the heat-sealed join which has been produced in the above-described manner, over a width of 38 mm. The sealing threshold is the heat-sealing temperature in respect of which the cold strength of the heat-sealed join produced is equal to or higher than 300 g/38 mm.

The hot strength of the heat-sealed joint is measured by means of a metal blade which is curved over onto itself in such a way that when the ends of the blade touch each other, the blade applies an opening force of 45 g. A strip of the film which is 30 mm in width and which is greater in length than the blade is disposed over the blade, on the outside thereof, so that the copolymer layer is disposed on the blade side and the ends of the film strip project beyond the ends of the blade. The blade and the film covering the blade are bent over and the two free ends of the film are pressed between two jaws which are formed with notches, under a pressure of 35 kg/cm² at the selected temperature, for a period of one second, while the blade is held under tension. Just before the jaws are opened, the blade is released so that it applies an opening force of 45 g to the heat-sealed join. The sample is admitted as satisfying the hot strength test on the heat-sealed join or weld at the selected temperature when the join comes open over a depth of less than 3 mm. In this way it is possible to determine the temperature ranges within the limits of which the film satisfies the hot strength test on the join. The jaws used measure 10 mm × 200 mm and their surface comprises a succession of contiguous notches which are parallel to the small side of the jaws and whose profile is formed by a right isosceles triangle placed on its long side which measures 1.6 mm. When the jaws are closed, the teeth of the jaws engage into each other. The jaws grip the film transversely over a surface area measuring 10 mm × 30 mm.

The scratch resistance of the film is evaluated in the following manner: a sample of the film which measures 10 cm × 20 cm is folded over onto itself to form a square measuring 10 cm × 10 cm.

The square is rubbed vigorously between the hands, 5 times in each direction. The number and depth of the grooves are evaluated visually and the result is noted by comparison as being good, average or poor.

Examples 1 to 5 and Comparative Examples $C_1$ to $C_6$

I. Under the conditions set forth in the type example above the copolymers of Examples 1 to 5 are prepared, the contents thereof of units derived from but-1-ene being set forth in Table I. The copolymers of comparative examples $C_1$ to $C_6$ are also prepared, under the conditions of type Example A of French patent application No. 79 01123 and certificate of addition application No. 79 19519; the content in respect of units derived from but-1-ene in the copolymers of comparative examples $C_1$ to $C_6$ is set forth in Table II.

The following parameters are measured on the copolymers:

(a) The content by weight of units derived from but-1-ene (Bu) by infra-red absorption, from which the propylene molar content is deduced: [P];

(b) Fluidity index under a pressure of 2 bars at 230° C. ($IF2_{230}$) which is measured in accordance with standard ASTM D 1238;

(c) Fusion enthalpy, by means of a Perkin-Elmer sweep-type differential microcalorimeter. The enthalpic diagram of a sample of 5 mg of the copolymer is recorded, by heating at a rate of 16° C./minute to a temperature of 200° C. (the sample is previously subjected to a heat treatment which comprises heating at a gradient of 16° C./minute to 200° C., holding at that temperature for 20 minutes and then cooling at a gradient of 16° C./minute to a temperature of 50° C.). The recorded surface area is proportional to the enthalpy;

(d) The proportion (PRE) of isolated ethyl branches with respect to the total of ethyl branches, by nuclear magnetic resonance of carbon 13 by means of a Bruker WH 360 apparatus operating at 90.52 MHz for $13_C$ on a solution of copolymer in orthodichlorobenzene at 120° C. with tetramethylsilane as a reference. The surface area of two peaks is determined, one peak being $S_1$ at 42.8 ppm corresponding to the isolated ethyl branches and the other being $S_2$ at 39.7 ppm corresponding to the other ethyl branches.

The ratio PRE is equal to $S_1/(S_1+S_2)$.

The ratio PRE is compared to $[P]^2$; the expression $PRE/[P]^2$ which is always at least equal to unity makes it possible to characterize the distribution of the isolated links derived from but-1-ene, with respect to a theoretical random distribution of such links.

II. Films of heat-sealable polypropylene are prepared from the foregoing copolymers in accordance with the above-described type example. Taking such films, measurements are made in respect of the sealing threshold and the hot strength range of the heat-sealed join, in the manner described above.

Figure 1:
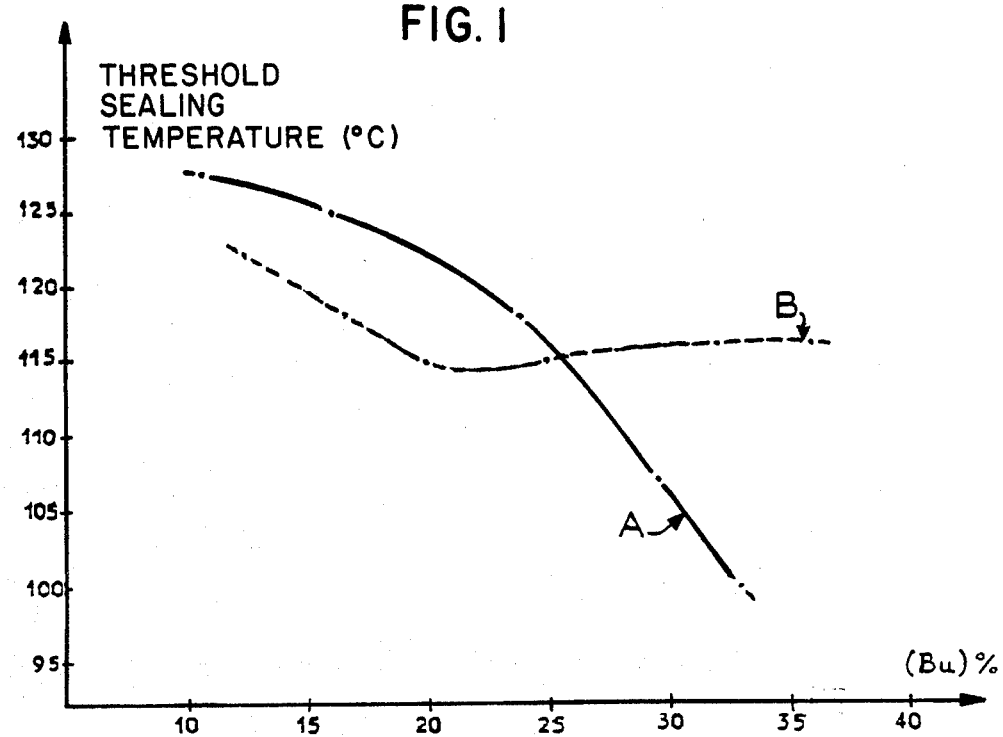
FIG. 1 shows curves in which Curve A represents the variation in temperature of the sealing threshhold of the copolymers of examples 1-5 and Curve B shows the variation in respect to the copolymers of examples $C_1-C_6$.
Figure 2:
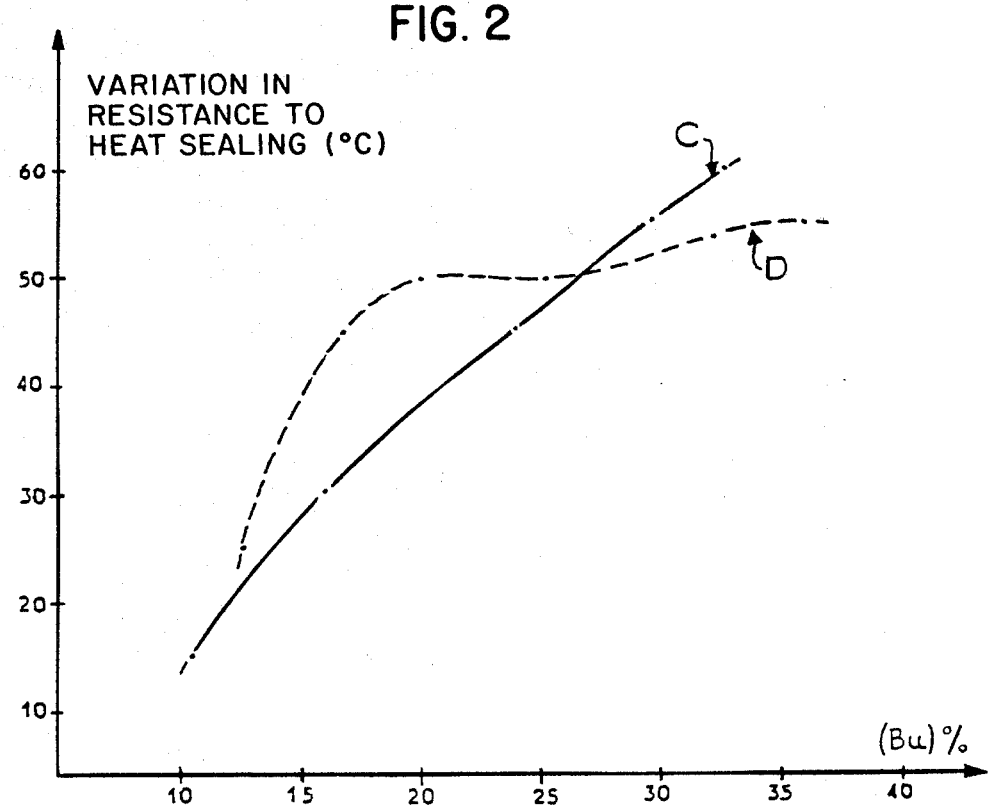
FIG. 2 shows curves in which Curve C represents the variation in the hot strength range for the heat sealed joints of copolymers of examples 1-5 and Curve D shows the variation in the copolymers of examples $C_1-C_6$.

The results which are set forth in Tables I and II show that:

For the copolymers according to the invention, the expression $PRE/[P]^2$ is always markedly greater than unity, in particular for the copolymers of Examples 4 and 5 wherein the content by weight of but-1-ene is higher than 25%. In contrast, the expression $PRE/[P]^2$ is only slightly higher than unity for the copolymers of comparative examples $C_1$ to $C_6$. This means that, with an equal but-1-ene content, the links which are derived from but-1-ene are distributed in the macromolecular chain of the copolymers prepared in accordance with the invention, in a more dispersed manner than that which could be forecast on the basis of theoretical considerations, whereas the dispersion is substantially closer to theory for the copolymers of comparative examples $C_1$ to $C_6$;

The temperature of the sealing threshold decreases progressively in proportion as the content by weight of but-1-ene increases whereas that temperature is stabilized at around 115° C. for the copolymers of comparative examples $C_3$ to $C_6$ in which the but-1-ene content is equal to or greater than 20%. This phenomenon is illustrated in FIG. 1 in which curve A represents the variation in the temperature of the sealing threshold of the copolymers of Examples 1 to 5 while curve B shows the variation in that temperature in respect of the copolymers of examples $C_1$ to $C_6$;

The hot strength range of the heat-sealed join increases progressively as the but-1-ene content by weight increases, whereas that range is stabilized in the vicinity of 50° to 55° C. for the copolymers of comparative examples $C_3$ to $C_6$ in which the but-1-ene content is equal to or greater than 20%. This phenomenon is illustrated in FIG. 2 in which curve C represents the variation in the hot strength range for the heat-sealed join of the copolymers of examples 1 to 5 while curve D shows the variation in that range as measured on copolymers of examples $C_1$ to $C_6$.

In addition, the films which are produced from the copolymers according to the invention have good scratch resistance which is evaluated in the above-described manner, and excellent transparency as measured by means of a "hazemeter" in accordance with standard ASTM D 1003-61.

TABLE I

| Example | 1 | 2 | 3 | 4 | 5 |
|---|---|---|---|---|---|
| COPOLYMERS | | | | | |
| (Bu) % | 10.5 | 16 | 23.8 | 29.4 | 32.5 |
| $IF_{230}{}^2$ | 0.8 | 4 | 3.5 | 2 | 3.6 |
| Fusion enthalpy (cal/g) | 17.5 | 16 | 13 | 10 | 8 |
| [P] | 0.92 | 0.87 | 0.81 | 0.76 | 0.73 |
| $[P]^2$ | 0.84 | 0.76 | 0.66 | 0.58 | 0.54 |
| PRE | 0.93 | 0.81 | 0.77 | 0.73 | 0.70 |
| $PRE/[P]^2$ | 1.10 | 1.06 | 1.17 | 1.25 | 1.30 |
| FILM | | | | | |
| Sealing threshold (°C.) | 127.5 | 125 | 118 | 107 | 100 |
| Hot strength of the heat-sealed join: range (°C.) | 125–140 | 115–145 | 100–145 | 90–145 | 85–145 |
| difference between limits (°C.) | 15 | 30 | 45 | 55 | 60 |

TABLE II

| Example | $C_1$ | $C_2$ | $C_3$ | $C_4$ | $C_5$ | $C_6$ |
|---|---|---|---|---|---|---|
| COPOLYMERS | | | | | | |
| (Bu) % | 12.5 | 16.5 | 20 | 25 | 32 | 36 |
| $IF_{230}{}^2$ | 2 | 3 | 3 | 3.5 | 3 | 4 |
| Fusion enthalpy (cal/g) | 14.3 | 11 | 10 | 8 | 7 | 6 |
| [P] | 0.90 | 0.87 | 0.84 | 0.80 | 0.74 | 0.70 |
| $[P]^2$ | 0.81 | 0.76 | 0.705 | 0.64 | 0.55 | 0.49 |
| PRE | 0.85 | 0.84 | 0.72 | 0.68 | 0.59 | 0.50 |
| $PRE/[P]^2$ | 1.05 | 1.10 | 1.02 | 1.06 | 1.07 | 1.0 |
| FILM | | | | | | |
| Sealing threshold (°C.) | 122 | 118 | 115 | 115 | 116 | 116 |
| Hot strength of the heat-sealed join: range (°C.) | 115–140 | 100–145 | 95–145 | 95–145 | 93–145 | 90–145 |
| difference between limits (°C.) | 25 | 45 | 50 | 50 | 52 | 55 |

We claim:

1. A process for the production of copolymers of propylene and but-1-ene, wherein the proportion by weight of units derived from but-1-ene is from 10 to 40% and wherein the proportion, denoted by the symbol "PRE" of isolated ethyl branches is at least equal to the square of the proportion (P) of units derived from propylene which are contained in said copolymers, said process being characterized as a continuous process in which a gaseous mixture of propylene and but-1-ene is introduced into a fluidization vessel for admixture in a dry fluidized state with a catalytic system which is stereospecific in the polymerization of propylene alone and consists essentially of a solid titanium trichloride and one or more organo-metallic compounds of the metals of groups II and III of the periodic table of elements, continuously withdrawing unreacted monomers and solid polymer particles from the reaction vessel, separating unreacted monomers from the remainder, recycling separated unreacted monomer to the reaction vessel, and adding monomer for introduction with the recycle gaseous monomer in an amount to maintain relatively constant the ratio of monomers introduced into the reaction vessel for polymerization, and maintaining the fluidized materials in the reaction vessel under pressure of less than 40 bars during the polymerization reaction.

2. A process as claimed in claim 1 in which the proportion by weight of units derived from but-1-ene is within the range of 20 to 35%.

3. A process as claimed in claim 1 wherein the ratio between the amounts of propylene and but-1-ene contained in the polymerization medium is kept at a constant value during the polymerization operation by means of an analyzer for measuring the ratio between the concentrations in respect of propylene and but-1-ene in the polymerization medium and means controlled by the analyzer for introducing propylene and but-1-ene into the polymerization medium.

4. A process as claimed in claim 1 wherein the solid titanium trichloride is produced by the reduction of titanium tetrachloride by means of an organo-aluminum compound at a temperature of from −10° to 80° C. and then by heating of the resulting precipitate, in the presence of an excess of titanium tetrachloride, at a temperature that does not exceed up to 115° C., these operations being carried out in the presence of an electron donor compound.

5. A process as claimed in claim 4 in which the electron donor compound is an ether having the formula R′—O—R″ wherein R′ and R″ are alkyl groups containing from 2 to 5 carbon atoms.

6. A process as claimed in claim 4 wherein the solid titanium trichloride is prepared in the presence of a molar excess of titanium tetrachloride of at least 20% with respect to the molar amount of organic radicals of the organo-aluminum compound and, as the electron donor compound, from 2 to 5 moles of aliphatic ether per mole of organo-aluminum compound, mixing the organo-aluminum compound before the reduction of the titanium tetrachloride with at least 0.3 mole of ether per mole of organo-aluminum compound.

7. A process as claimed in claim 1 wherein the catalyst is present in the form of a pre-polymer produced by preliminary polymerization of a gram-atom of titanium of the catalytic system per 20 to 5000 moles of ethylene, propylene, but-1-ene or a mixture of two or more of said olefins.

8. A process as claimed in claim 1 which is performed by direct contact of a gaseous mixture containing propylene and but-1-ene, at a pressure of less than 40 bars and at a temperature of from 50° to 90° C., with particles of copolymer in a fluidization reaction vessel, maintaining the particles of copolymer in the course of formation and those containing the catalytic system in the fluidized state by a rising flow of the mixture of the monomers in the gaseous state.

9. A process as claimed in claim 8 in which the catalyst is present in a granular carrier.

* * * * *